(12) United States Patent
Barfield

(10) Patent No.: US 6,691,973 B1
(45) Date of Patent: Feb. 17, 2004

(54) APPARATUS AND METHOD FOR SUPPORTING A FISHING ROD

(76) Inventor: James Barfield, 5647 Conway Dr., Marietta, GA (US) 30068

( * ) Notice: Subject to any disclaimer, the term of this patent is extended or adjusted under 35 U.S.C. 154(b) by 0 days.

(21) Appl. No.: 10/226,721

(22) Filed: Aug. 23, 2002

(51) Int. Cl.$^7$ ............................................. F16M 13/00
(52) U.S. Cl. ...................... 248/530; 248/156; 248/538; 248/545; 43/21.2; D22/147
(58) Field of Search ................. 248/530, 538, 248/156, 545; 43/21.2; D22/147

(56) References Cited

U.S. PATENT DOCUMENTS

| | | | |
|---|---|---|---|
| 2,059,921 A | * 11/1936 | Weiss | 248/530 |
| 2,202,739 A | 5/1940 | Kilby | |
| 2,487,094 A | * 11/1949 | Brown | 248/518 |
| 3,612,455 A | 10/1971 | Cole | |
| 3,636,649 A | * 1/1972 | Paiva | 43/21.2 |
| 3,669,390 A | 6/1972 | Nielson | |
| 4,938,446 A | 7/1990 | Williams | |
| 5,025,584 A | * 6/1991 | Butterwick, Sr. | 43/21.2 |
| 5,345,708 A | 9/1994 | Loyd | |
| 5,359,803 A | 11/1994 | Shieh | |
| D359,793 S | 6/1995 | Medlin, Jr. et al. | |
| 5,488,798 A | 2/1996 | Beachel | |
| 5,557,877 A | 9/1996 | Colson | |
| 5,913,673 A | * 6/1999 | Womac | 43/54.1 |
| D431,277 S | 9/2000 | Mitchell | |
| 6,338,465 B1 | 1/2002 | Stoner | |
| 6,568,122 B1 | * 5/2003 | Smith | 43/21.2 |

OTHER PUBLICATIONS

HT Enterprises, "Wire Rod Holders", http://www.thornebros.com/winter/rods/rods_accessories.html.
Lightnin' Strike, "Automatic Hook–Set Rod Holder", http://www.lightning–strike.com/Accessories.htm.
Tsuribaka Fishing Ltd., "Rod Holders", http://www.tsuribaka.com/jp/fishing/rodholders.
Pro Fishing Supplies, "Rod Rest" http://www.pfsfish.com/rodrest.htm.

* cited by examiner

Primary Examiner—Ramon O. Ramirez
(74) Attorney, Agent, or Firm—Thomas, Kayden, Horstemeyer & Risley, LLP

(57) ABSTRACT

A universally applicable fishing rod support capable of being utilized on any type of terrain and/or surface for the effective support and proper angling position of any type and size fishing rod placed thereon, wherein an angler is able to move from passive to active engagement upon the quick and unhindered removal of the fishing rod from the fishing rod support.

55 Claims, 16 Drawing Sheets though supported herein, various modifications, changes, alternative constructions, and equivalents will now become apparent to those skilled in the art without departing from the spirit and scope of the invention. Accordingly, it is not intended that the invention be limited, except as by the appended claims.

APPARATUS AND METHOD FOR SUPPORTING A FISHING ROD

TECHNICAL FIELD

The present invention relates generally to supports and holders, and more specifically to an apparatus and method for supporting a fishing rod. The present invention is particularly suitable for, although not strictly limited to, enabling hands-free support and acutely angled positioning of a fishing rod.

BACKGROUND OF THE INVENTION

Whether engaged in recreational and/or sport fishing, every angler/fisherman typically requires certain fishing equipment in order to succeed in catching fish, wherein such equipment generally includes a fishing rod and reel, tackle, attractant/bait, and/or a tackle box. Many anglers also often utilize a rod holder to maintain the appropriate fishing rod angling position for increased catch success rates, as well as to free their hands for other tasks. In general, however, most available fishing rod holders/supports possess inherent disadvantages that render their use inefficient, impractical, and problematic.

To begin, in the absence of a machined and/or manufactured rod holder, many onshore fisherman are generally forced to utilize makeshift rod holders in order to free their hands, often fashioning a rudimentary fishing rod holder from a forked branch pushed into moist ground and/or forming a notch on a log for receipt therein of their fishing rod. Such options, however, bear obvious disadvantages. A forked branch anchored in moist soil is undoubtedly unstable and/or too weak to effectively support a conventional fishing rod, and a notched log may be too shallow to provide complete support of a rod placed therein. Moreover, such options are unlikely to provide the proper angling position required for catching fish. Unfortunately, however, in the absence of a machined and/or manufactured rod holder, without makeshift props, an onshore fisherman is left with the limited option of having to rest his/her rod on the ground in order to momentarily free his/her hands for alternate tasks, thus subjecting the fishing rod and associated reel to the undesirable intrusion of dirt/sand into gear mechanisms and/or other operative elements of the fishing rod. Moreover, without an effective rod holder, the angler is forced to maintain the proper angled position of the fishing rod until a catch is made, thus subjecting the angler to unnecessary bodily stress, tension, and/or fatigue.

Although a variety of onshore fishing rod holders are available, all possess limitations that make their use disadvantageous. For instance, temporarily mountable rod holders possessing clamp mechanisms are typically limited in their application, as they require a particular mounting surface, such as a dock or pier (i.e., rails, etc.), for proper installation. However, such dock or pier locations may not possess optimal fishing conditions. Moreover, because most such temporarily mountable rod holders require the fishing rod to be secured therein, quick removal of the rod becomes difficult.

Fishing rod mounts that attach to an ice chest or tackle box are also disadvantageous, as the ice chest or tackle box must be large enough and sturdy enough for proper supportive mounting thereon. Most such fishing rod mounts are unable to accommodate all sizes of rods, and further require the fishing rod to be holstered in a manner that makes quick removal of the rod therefrom extremely difficult.

Stand-alone fishing rod holders are also available, but are designed and limited to application on flat surfaces only, making their use in bank fishing impractical. Furthermore, because such stand-alone rod holders possess no anchoring mechanisms, they are too unstable for use, particularly on a dock or pier where they may tip over and/or be dragged therefrom. Most available stand-alone holders are also limited in their capacity to hold/support a variety of types and sizes of fishing rods, and further require the holstering of the rod therein in such a manner that makes removal of the rod therefrom awkward and time-consuming.

Although attempts have been made to design an effective ground-mounted fishing rod holder, most such available ground-mounted holders possess clear disadvantages that make their use undesirable and impractical. Specifically, most available ground-mounted holders require that the holder be pushed into the ground via hand pressure, a task that often proves difficult, if not impossible, in hard and/or rocky terrain. Furthermore, because such ground-mounted units are designed for impregnation of soil/ground only, they cannot be utilized on solid surfaces such as docks or piers. Moreover, like other rod holders, most available ground-mounted holders are limited in the type and size of rod that can be supported, and often require placement of the rod within the holder in such a manner that also makes quick removal of the rod therefrom a difficult task.

Additionally, it appears that most, if not all, current rod holders are too bulky and awkward to transport.

Therefore, it is readily apparent that there is a need for a universally applicable fishing rod support capable of being utilized on any type of terrain and/or surface for the effective support and proper angling position of any type and size fishing rod placed thereon, wherein an angler is able to move from passive to active engagement upon the quick and unhindered removal of the fishing rod from the fishing rod support, and wherein the fishing rod support is easily transported from one location to another in conjunction with one's fishing rod.

BRIEF SUMMARY OF THE INVENTION

Briefly described, in a preferred embodiment, the present invention overcomes the above-mentioned disadvantages and meets the recognized need for such a device by providing a hands-free fishing rod support apparatus that can effectively support and properly angle any type and size fishing rod placed therein and permit the quick removal therefrom, wherein the fishing rod support can be utilized on any type of terrain and/or surface, thus permitting the onshore fisherman to select any onshore site that provides optimal and/or desired fishing conditions.

According to its major aspects and broadly stated, the present invention in its preferred form is an apparatus and method for supporting a fishing rod, wherein the apparatus preferably possesses a first rod support member, a second rod support member, and a base member.

More specifically, the present invention is an apparatus and method for supporting a fishing rod, wherein the apparatus preferably possesses first and second rod support members, each preferably having a U-shaped cradle with two legs extending therefrom. The second rod support member is preferably shorter in height than the first rod support member to enable the angling of a fishing rod carried therein. Each leg of the first and second rod support members preferably possesses foot brackets for the application of foot pressure thereon so as to penetrably drive each leg into the ground/soil. For application of the rod support members on solid surfaces (i.e., dock, pier, etc.), an X-shaped base member is preferably utilized for the supportive placement therein of the first and second rod support members.

A feature and advantage of the present invention is its ability to be utilized on most any ground surface/terrain and/or any solid surface.

A feature and advantage of the present invention is its ability to accommodate any size fishing rod.

A feature and advantage of the present invention is its ability to permit the quick removal of a fishing rod placed thereon, thus permitting an angler/fisherman to quickly move from passive to active engagement.

A feature and advantage of the present invention is its ability to free a user's hands to tend to other activities while waiting for a catch.

A feature and advantage of the present invention is its portability.

A feature and advantage of the present invention is its simplicity of design.

A feature and advantage of the present invention is its ease of storage.

A feature and advantage of the present invention is its ease of manufacture.

A feature and advantage of the present invention is its durability.

A feature and advantage of the present invention is its stability.

A feature and advantage of the present invention is its light weight.

A feature and advantage of the present invention is its ability to be implemented without the use of tools.

A feature and advantage of the present invention is its ability to function maintenance-free.

These and other objects, features, and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATIVE EMBODIMENTS

In describing the preferred and alternate embodiments of the present invention, as illustrated in FIGS. 1–11, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
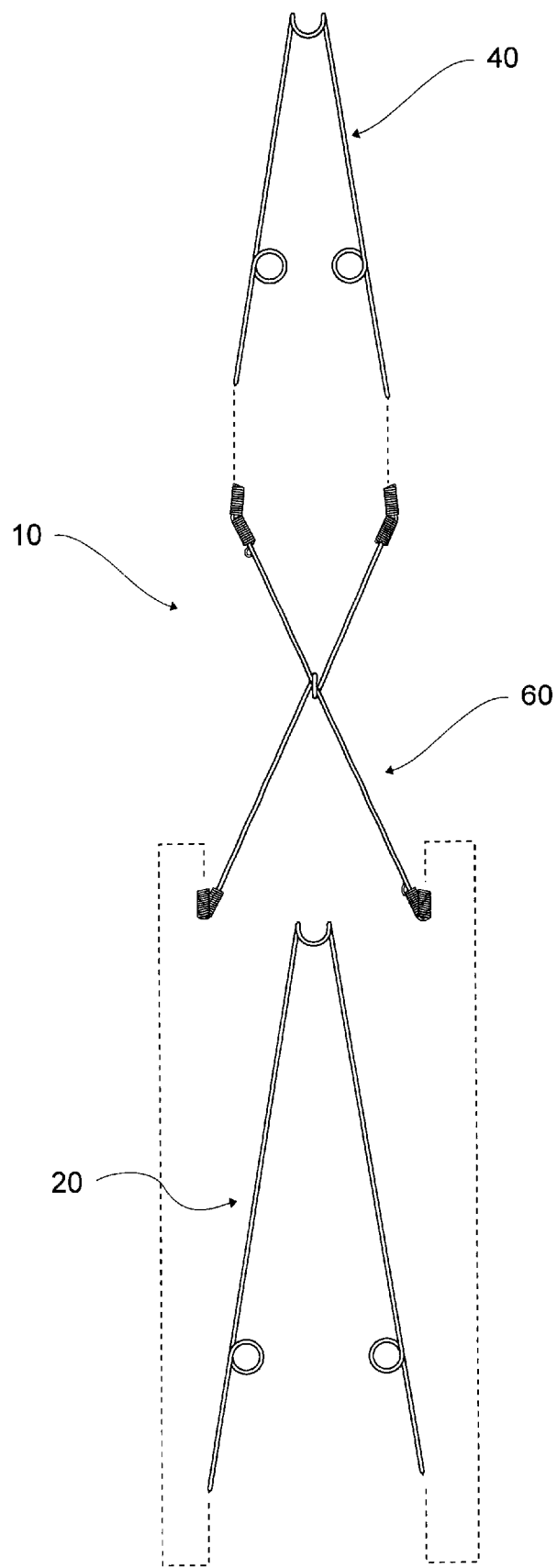
FIG. 1 is an exploded view of an apparatus for supporting a fishing rod according to a preferred embodiment of the present invention.

Referring now to FIG. 1, the present invention in a preferred embodiment is an apparatus 10, wherein apparatus 10 is a fishing rod support having first rod support member 20, second, rod support member 40 and base member 60. Preferably, first rod support member 20 and second rod support member 40 can be utilized individually and/or in concert with and/or without base member 60, as more fully described below.

Figure 2:
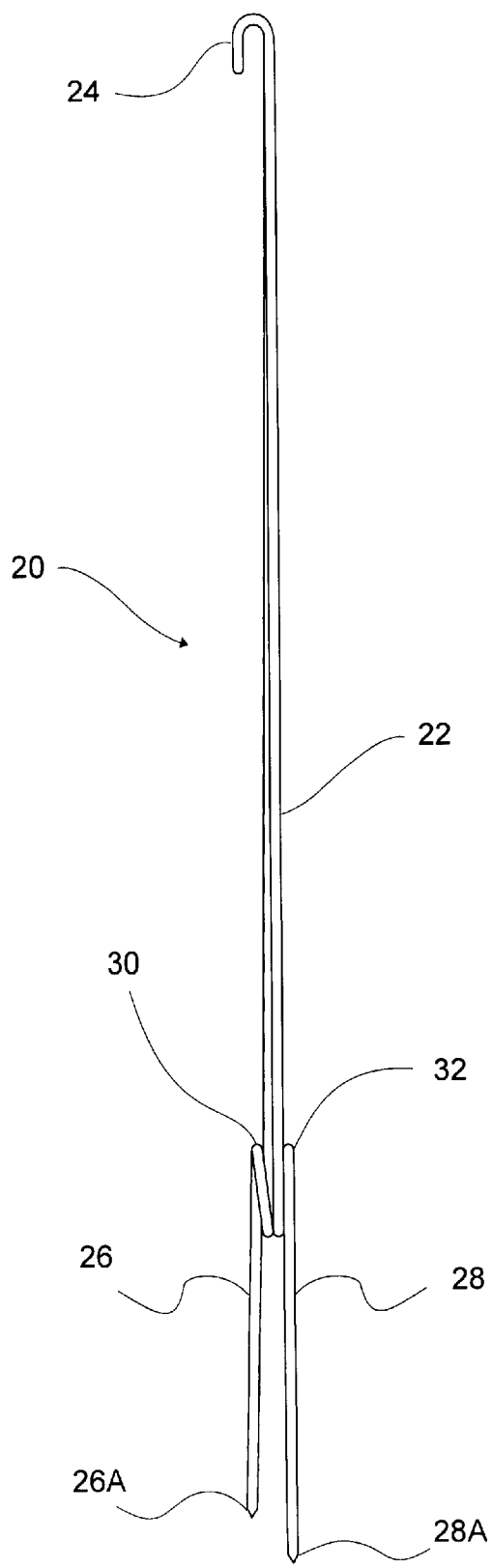
FIG. 2 is a side view of a first rod support member of an apparatus for supporting a fishing rod according to a preferred embodiment of the present invention.
Figure 3:
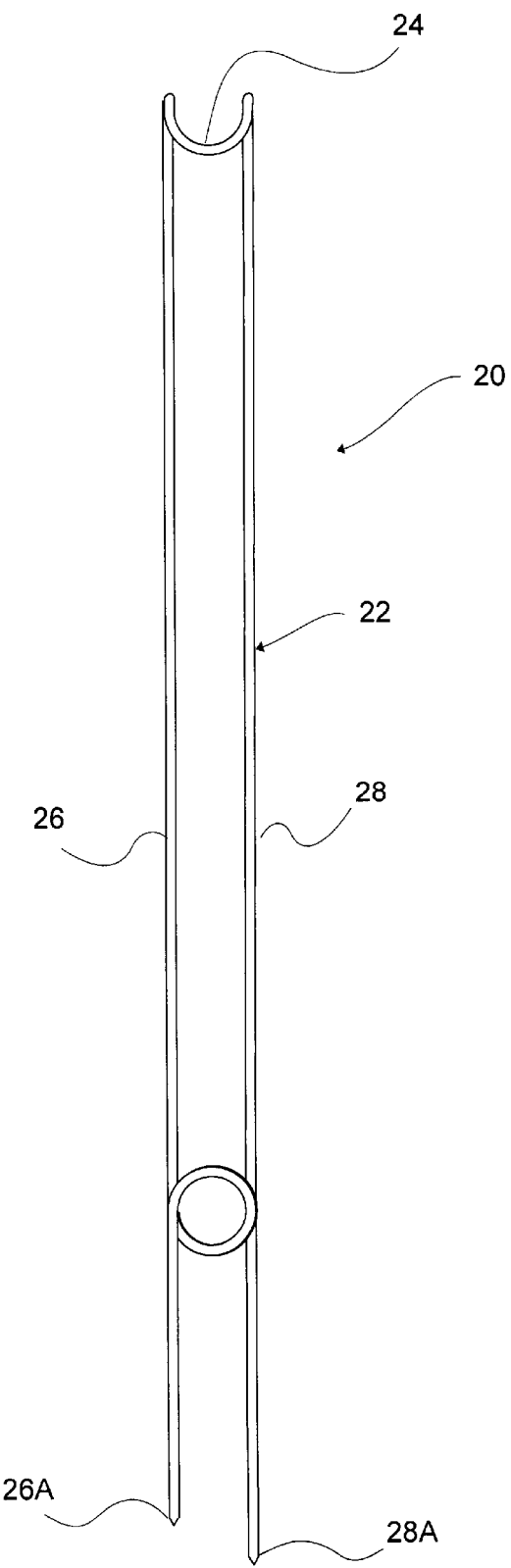
FIGS. 3 and 3A are front views of a first rod support member of an apparatus for supporting a fishing rod according to a preferred embodiment of the present invention.
Figure 3A:
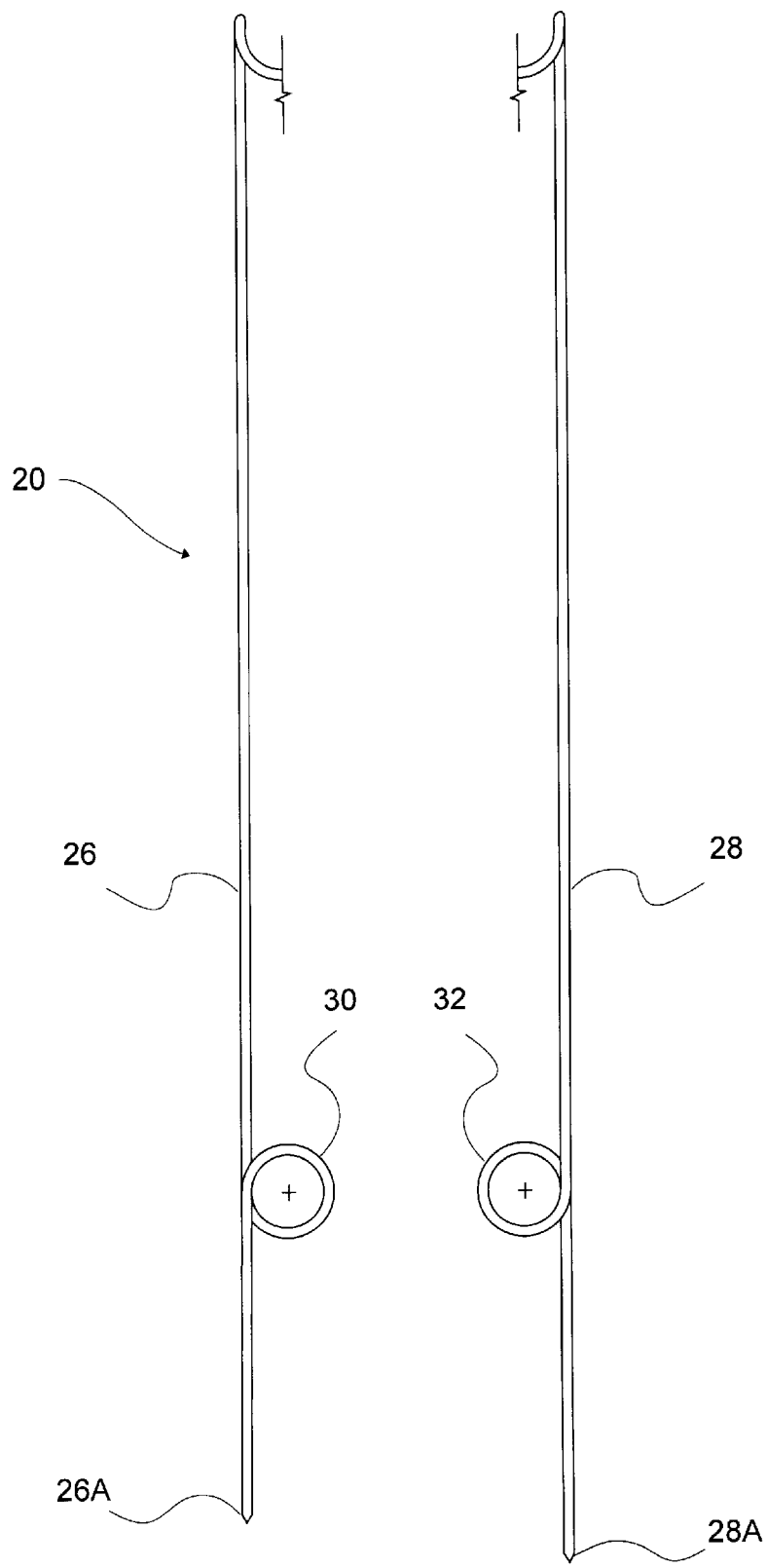

Referring now to FIGS. 2–3A, first rod support member 20 is preferably formed from a single metal rod 22, wherein rod 22 is preferably manipulated via known metal bending processes to form the unique and functional shape of first rod support member 20. Specifically, rod 22 possesses U-shaped cradle 24, wherein first leg 26 and second leg 28 preferably extend substantially downwardly therefrom, and wherein U-shaped cradle 24 is preferably substantially parallel to first leg 26 and second leg 28, as best illustrated in FIG. 2. It is contemplated in an alternate embodiment that cradle 24 could possess any other suitable shape, such as, for exemplary purposes only, square-trough-shape. U-shaped cradle 24 is preferably dimensioned to receive any size and/or shape of fishing rod placed therein. Although first rod support member 20 preferably possesses U-shaped cradle 24, it is contemplated in an alternate embodiment that first rod support member 20 could possess any number of cradles for the angled positioning and placement therein of a plurality of fishing rods. It is further contemplated in an alternate embodiment that first rod support assembly 20 could possess any number of legs extending from U-shaped cradle 24 for increased stability and/or rigidity of first rod support member 20 when placed into the ground. Furthermore, although metal is the preferred material of rod 22, and first rod support member 20 in general, it is contemplated in another alternate embodiment that rod 22 could be formed from any other suitable material, such as, for exemplary purposes only, a durable, yet resilient, plastic.

Second leg 28 of rod 22 of first rod support member 20 is preferably slightly longer than first leg 26 of rod 22 to facilitate placement of first rod support member 20 into the ground, as more fully described below. Preferably, end 26A of first leg 26 and end 28A of second leg 28 are pointed to facilitate penetration of the ground/soil by first leg 26 and second leg 28. Although end 26A and 28A of first leg 26 and second leg 28, respectively, are preferably pointed, it is contemplated in an alternate embodiment that ends 26A and 28A could be rounded, flattened, upwardly hooked and or serrated to facilitate the penetration and maintenance of first leg 26 and second leg 28 of first rod support member 20 in the ground/soil.

Formed preferably below the mid-region of first leg 26 is foot support loop 30, wherein foot support loop 30 is preferably formed on first leg 26 via known metal bending processes, and wherein foot support loop 30 preferably functions to receive foot pressure thereon for penetrably driving first leg 26 into the ground. As best depicted in FIG. 3A, foot support loop 30 is preferably spot-welded to first leg 26 for overall strength and durability and to endure foot pressure when applied thereto. Although first leg 26 preferably possesses foot support loop 30 only, it is contemplated in an alternate embodiment that first leg 26 could possess additional foot support loops and/or an additional foot support loop formed and positioned opposite foot support loop 30 to further facilitate the penetrable driving of first leg 26 into the ground/soil.

Similarly, formed preferably below the mid-region of second leg 28 is foot support loop 32, wherein foot support loop 32 is preferably formed on second leg 28 via known metal bending processes, and wherein foot support loop 32 also preferably functions to receive foot pressure thereon for penetrably driving second leg 28 into the ground. As best depicted in FIG. 3A, foot support loop 32 is preferably spot-welded to second leg 28 for overall strength and durability and to endure foot pressure when applied thereto. Although second leg 28 preferably possesses foot support loop 32 only, it is contemplated in an alternate embodiment that second leg 28 could possess additional foot support loops and/or an additional foot support loop formed and positioned opposite foot support loop 32 to further facilitate the penetrable driving of second leg 28 into the ground/soil.

Figure 4:
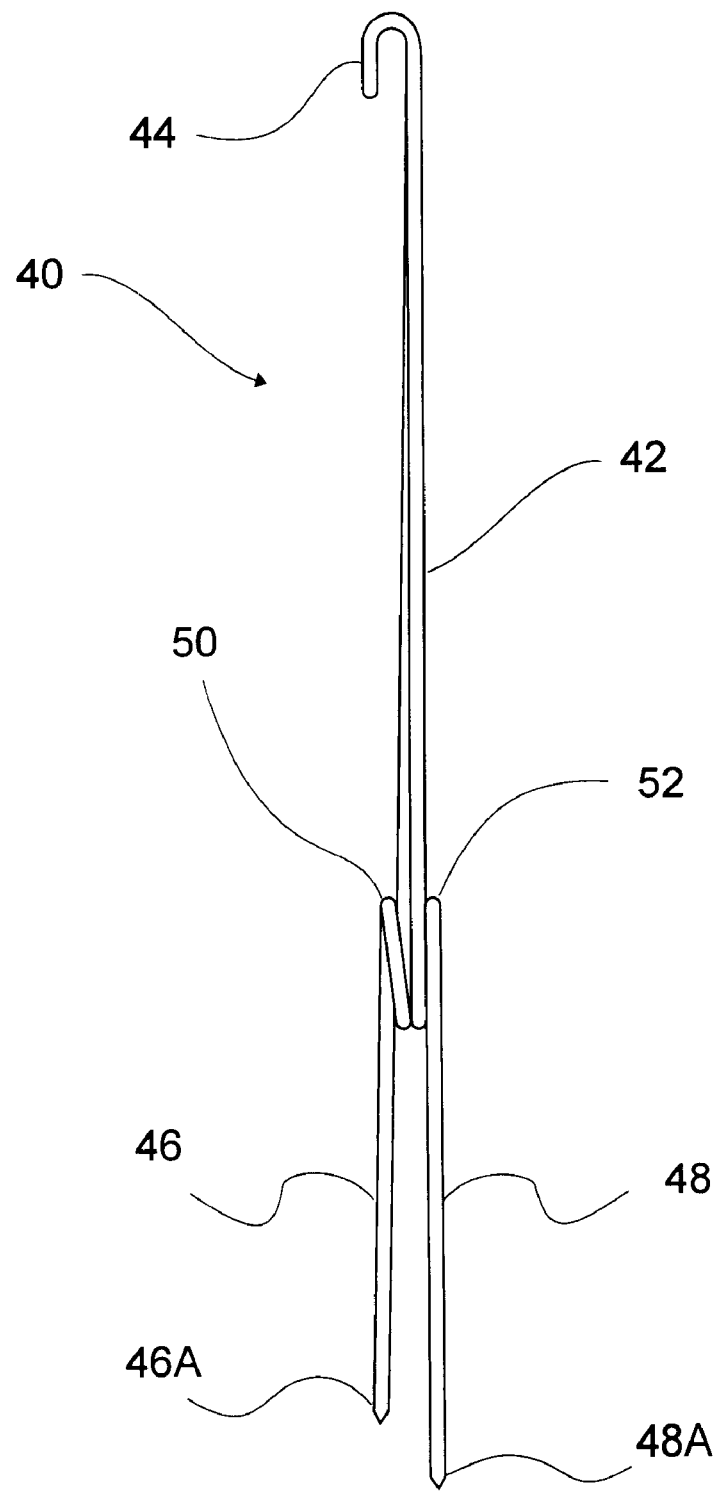
FIG. 4 is a side view of a second rod support member of an apparatus for supporting a fishing rod according to a preferred embodiment of the present invention.
Figure 5:
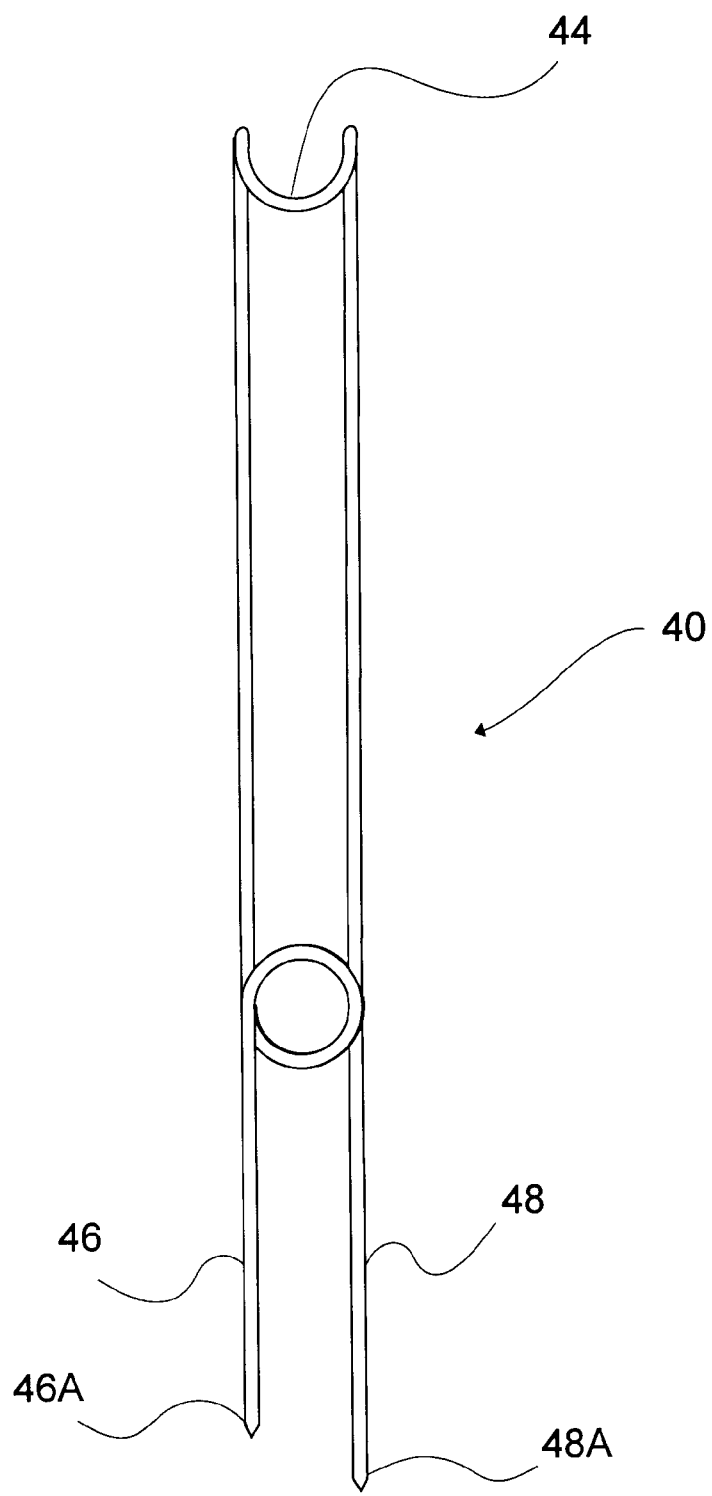
FIGS. 5 and 5A are front views of a second rod support member of an apparatus for supporting a fishing rod according to a preferred embodiment of the present invention.
Figure 5A:
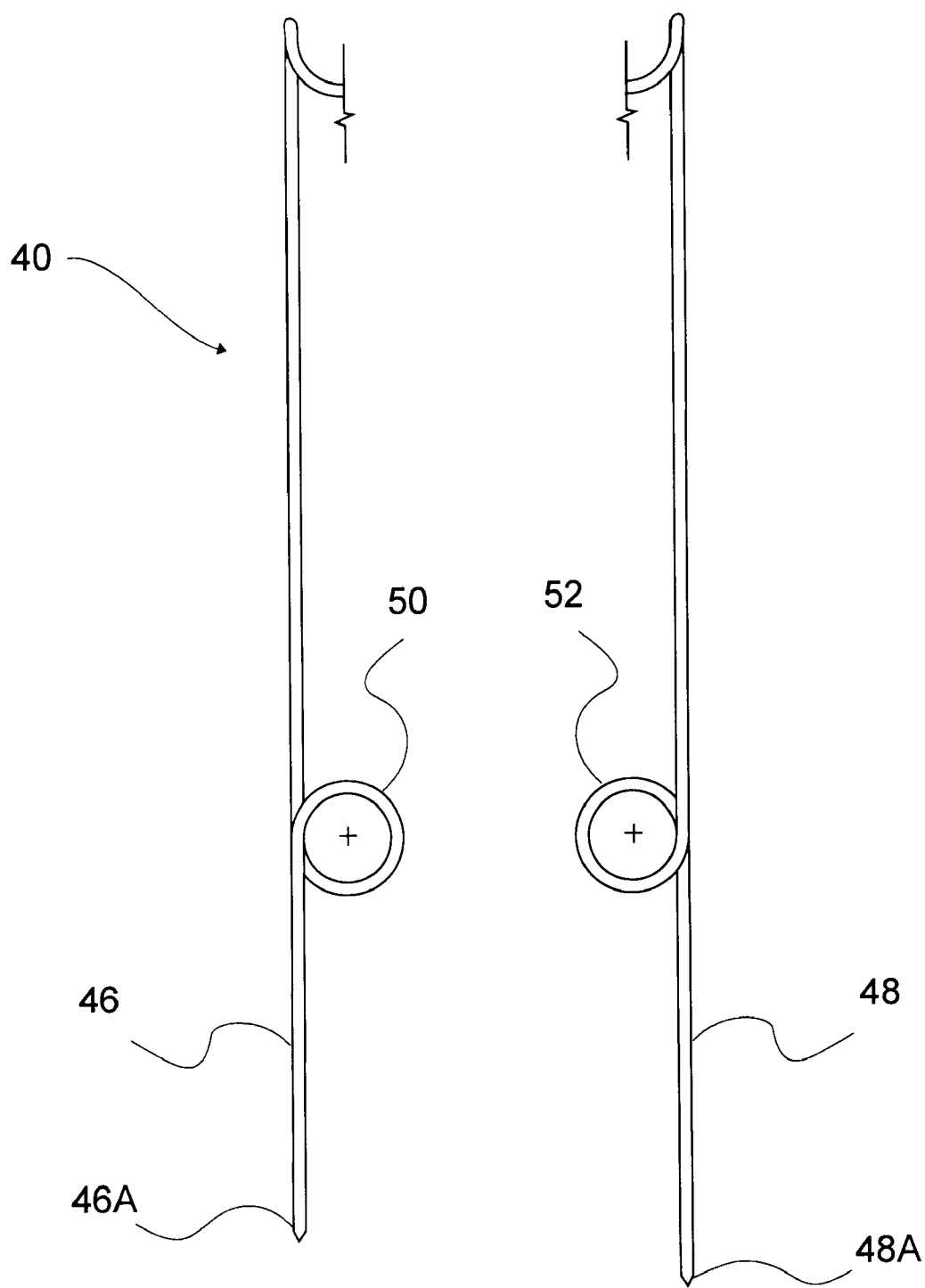

Referring now to FIGS. 4–5A, second rod support member 40 is preferably formed from a single metal rod 42, wherein rod 42 is preferably manipulated via known metal bending processes to form the unique and functional shape of second rod support member 40. Specifically, rod 42 possesses U-shaped cradle 44, wherein first leg 46 and second leg 48 preferably extend substantially downwardly therefrom, and wherein U-shaped cradle 44 is preferably substantially parallel to first leg 46 and second leg 48, as best illustrated in FIG. 4. It is contemplated in an alternate embodiment that cradle 44 could possess any other suitable shape, such as, for exemplary purposes only, square-trough-shape. U-shaped cradle 44 is preferably dimensioned to receive any size and/or shape of fishing rod placed therein. Although second rod support member 40 preferably possesses U-shaped cradle 44, it is contemplated in an alternate embodiment that second rod support member 40 could possess any number of cradles for the angled positioning and placement therein of a plurality of fishing rods. It is further contemplated in an alternate embodiment that second rod support assembly 40 could possess any number of legs extending from U-shaped cradle 44 for increased stability and/or rigidity of second rod support member 40 when placed into the ground. Furthermore, although metal is the preferred material of rod 42, and second rod support member 40 in general, it is contemplated in another alternate embodiment that rod 42 could be formed from any other suitable material, such as, for exemplary purposes only, a durable, yet resilient, plastic.

Second leg 48 of rod 42 of second rod support member 40 is preferably slightly longer than first leg 46 of rod 42 to facilitate placement of second rod support member 40 into the ground, as more fully described below. Preferably, end 46A of first leg 46 and end 48A of second leg 48 are pointed to facilitate penetration of the ground/soil by first leg 46 and second leg 48. Although end 46A and 48A of first leg 46 and second leg 48, respectively, are preferably pointed, it is contemplated in an alternate embodiment that ends 46A and 48A could be rounded, flattened, upwardly hooked and or serrated to facilitate the penetration and maintenance of first leg 46 and second leg 48 of second rod support member 40 in the ground/soil.

Formed preferably below the mid-region of first leg 46 is foot support loop 50, wherein foot support loop 50 is preferably formed on first leg 46 via known metal bending processes, and wherein foot support loop 50 preferably functions to receive foot pressure thereon for penetrably driving first leg 46 into the ground. As best depicted in FIG. 1, foot support loop 50 is preferably spot-welded to first leg 46 for overall strength and durability and to endure foot pressure when applied thereto. Although first leg 46 preferably possesses foot support loop 50 only, it is contemplated in an alternate embodiment that first leg 46 could possess additional foot support loops and/or an additional foot support loop formed and positioned opposite foot support loop 50 to further facilitate the penetrable driving of first leg 46 into the ground/soil.

Similarly, formed preferably below the mid-region of second leg 48 is foot support loop 52, wherein foot support loop 52 is preferably formed on second leg 48 via known metal bending processes, and wherein foot support loop 52 also preferably functions to receive foot pressure thereon for penetrably driving second leg 48 into the ground. As best depicted in FIG. 1, foot support loop 52 is preferably spot-welded to second leg 48 for overall strength and durability and to endure foot pressure when applied thereto. Although second leg 48 preferably possesses foot support loop 52 only, it is contemplated in an alternate embodiment that second leg 48 could possess additional foot support loops and/or an additional foot support loop formed and positioned opposite foot support loop 52 to further facilitate the penetrable driving of second leg 48 into the ground/soil.

Figure 5B:
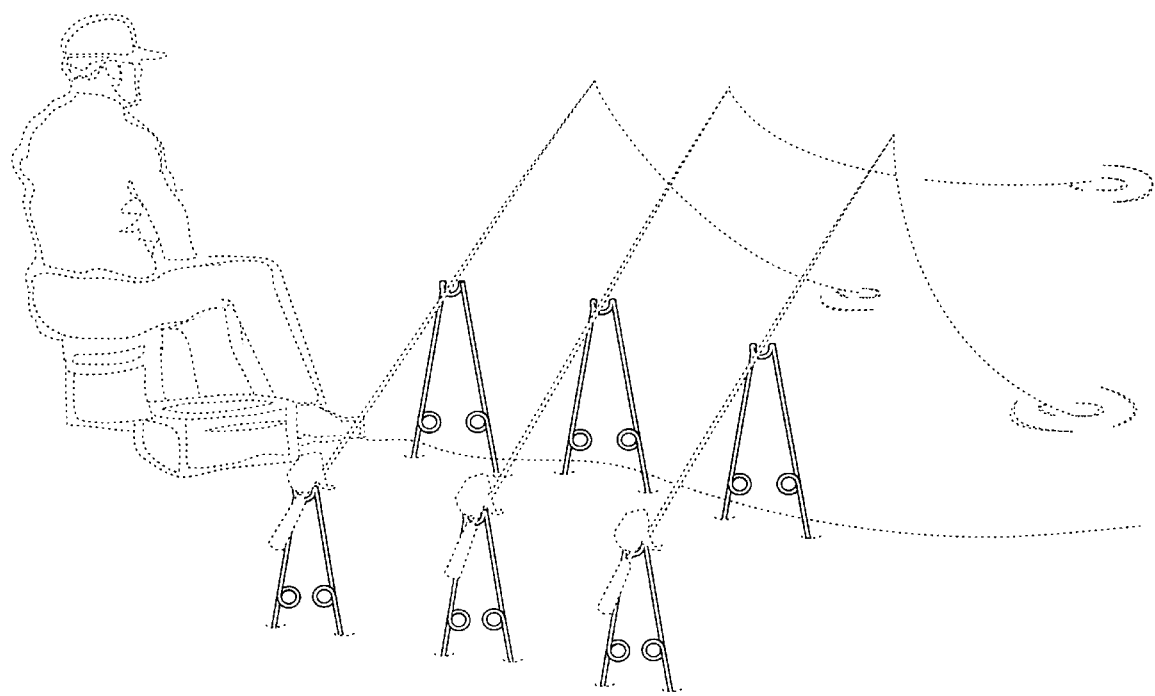
FIG. 5B is a perspective view of the first and second rod support members of an apparatus for supporting a fishing rod according to a preferred embodiment of the present invention, showing the devices in use.

Preferably, second rod support member 40 is substantially duplicative of first rod support member 20, but is preferably shorter in length than first rod support member 20, thus facilitating the proper/desired acute angling of fishing pole AA placed within cradle 24 and cradle 44 of first rod support member 20 and second rod support member 40, respectively, as best illustrated in FIG. 5B.

Figure 11:
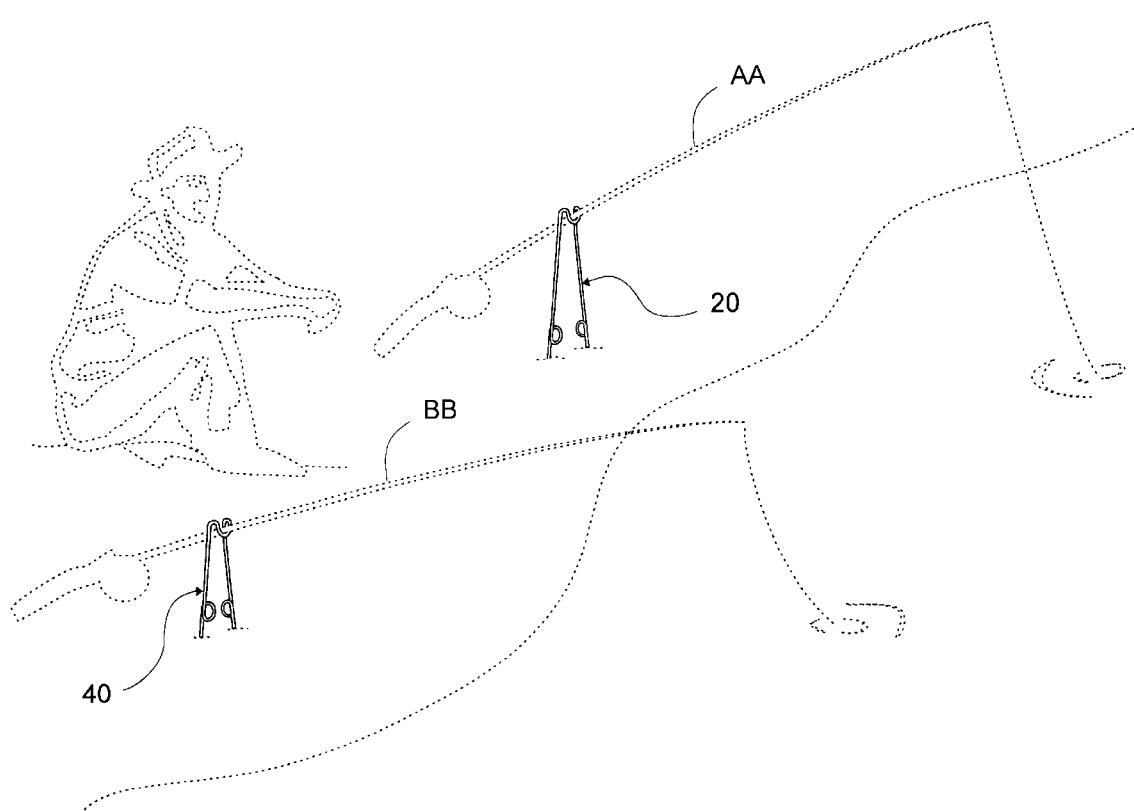
FIG. 11 is a perspective view of the first and second rod support members of an apparatus for supporting a fishing rod according to a preferred embodiment of the present invention, showing the devices being utilized in an alternate embodiment.

Referring now more specifically to FIG. 5B, in use, end 28A of second leg 28 of first rod support member 20 is preferably first driven into the ground via minimal hand pressure until end 26A of first leg 26 lightly contacts/abuts the ground. Thereafter, first leg 26 is preferably slightly pulled away from second leg 28, just enough for the insertion of a user's foot between first leg 26 and second leg 28 and above foot support loops 30 and 32. The user then applies foot pressure onto foot support loops 30 and 32 to forcefully drive first leg 26 and second leg 28 into the ground to a desired depth. Similarly, second rod support member 40 is positioned at a desired distance from and parallel to first rod support member 20, wherein end 48A of second leg 48 of second rod support member 40 is preferably first driven into the ground via minimal hand pressure until end 46A of first leg 46 lightly contacts/abuts the ground. Thereafter, first leg 46 is preferably slightly pulled away from second leg 48, just enough for the insertion of a user's foot between first leg 46 and second leg 48 and above foot support loops 50 and 52. The user then applies foot pressure onto foot support loops 50 and 52 to forcefully drive first leg 46 and second leg 48 into the ground to a desired depth. Thereafter, fishing rod AA is preferably placed within cradles 24 and 44 of first rod support member 20 and second rod support member 40, respectively, thus situating the fishing rod AA at the proper/desired angled position. As best illustrated in FIG. 11, it is contemplated in an alternate embodiment that first rod support member 20 and/or second rod support member 40 could be utilized individually for the supportive angling of two fishing rods AA and BB, respectively, therein.

Upon removal of first rod support member 20 from the ground, first leg 26 and second leg 28 preferably resiliently spring back together, resulting in foot loops 30 and 32 overlapping one another and thus, yielding a folded and/or compact first rod support member 20, as best illustrated in FIG. 3. Similarly, upon removal of second rod support member 40 from the ground, first leg 46 and second leg 48 preferably resiliently spring back together, resulting in foot loops 50 and 52 overlapping one another and thus, yielding a folded and/or compact first rod support member 40, as best illustrated in FIG. 5.

Figure 6:
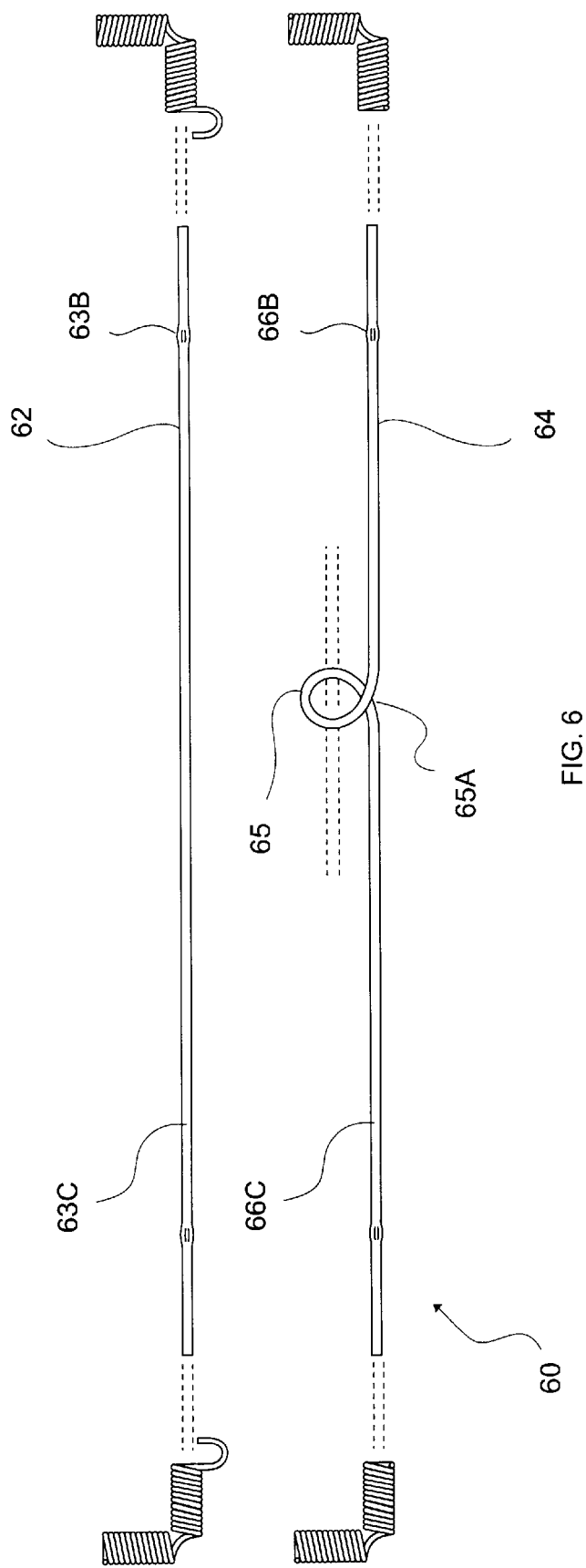
FIG. 6 is a side view of an unassembled base member of an apparatus for supporting a fishing rod according to a preferred embodiment of the present invention.
Figure 7:
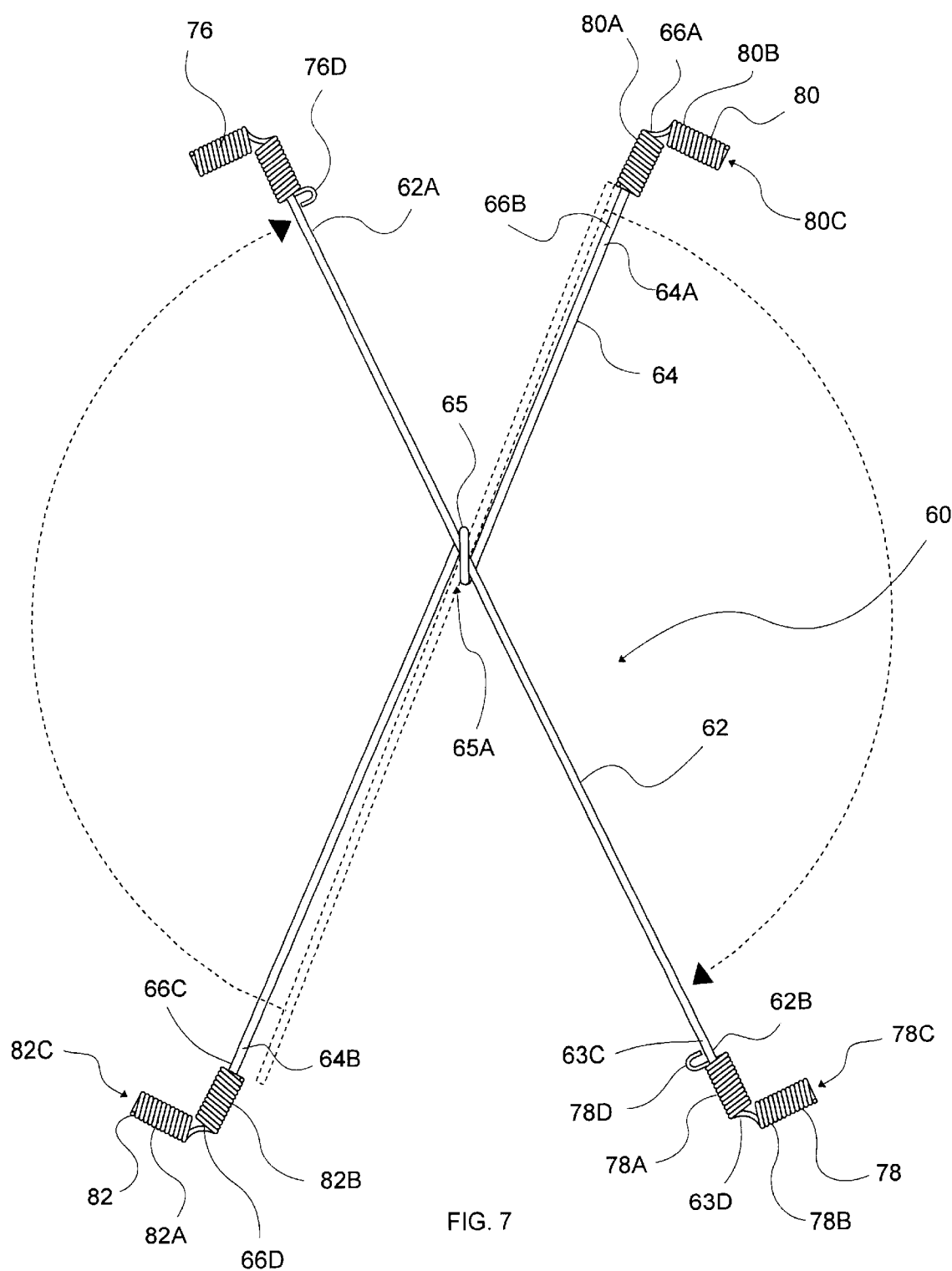
FIG. 7 is a top view of an assembled base member of an apparatus for supporting a fishing rod according to a preferred embodiment of the present invention.
Figure 7A:
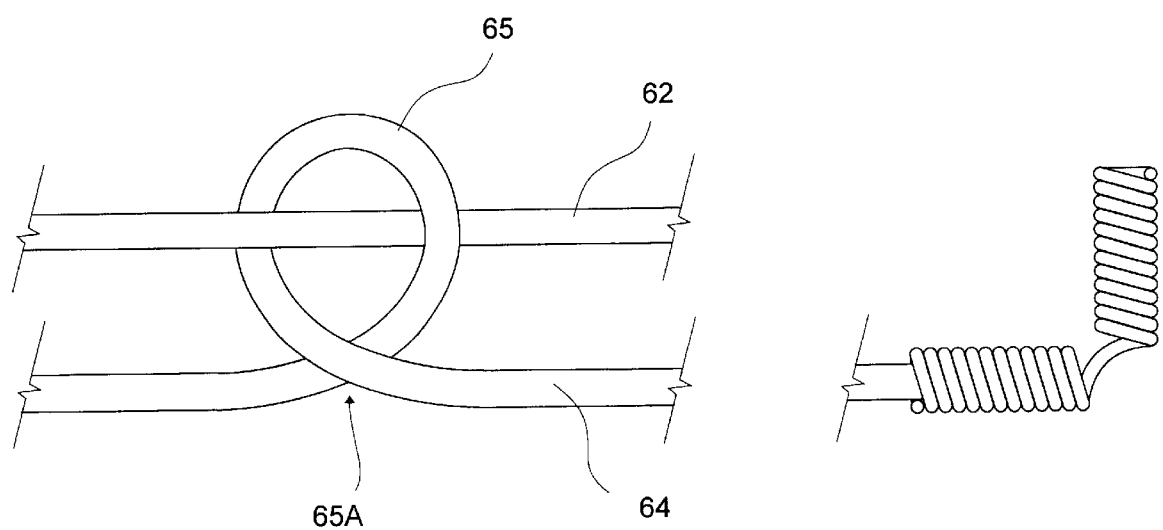
FIG. 7A is a partial side view of an assembled base member of an apparatus for supporting a fishing rod according to a preferred embodiment of the present invention.

Referring now to FIGS. 6–7A, if a user of first rod support member 20 and second rod support member 40 wishes to utilize first rod support member 20 and second rod support member 40 on a solid surface, such as a dock or pier, base member 60 is preferably utilized in conjunction therewith.

Specifically, base member 60 possesses first arm 62 and second arm 64, wherein first arm 62 preferably possesses a substantially continuous, uninterrupted pole-shape, and wherein second arm 64 is also pole-shaped, but preferably possesses a loop 65 formed preferably slightly off-center thereon. Loop 65 is preferably an open loop possessing gap 65A, wherein gap 65A preferably permits the introduction therethrough of first arm 62 for the pivotal locking connection of first arm 62 therein, as best illustrated in FIGS. 7 and 7A. First arm 62 and second arm 64 are preferably formed from a metal, although other suitable material could be utilized, such as, for exemplary purposes only, durable plastic and/or wood.

Figure 6A:
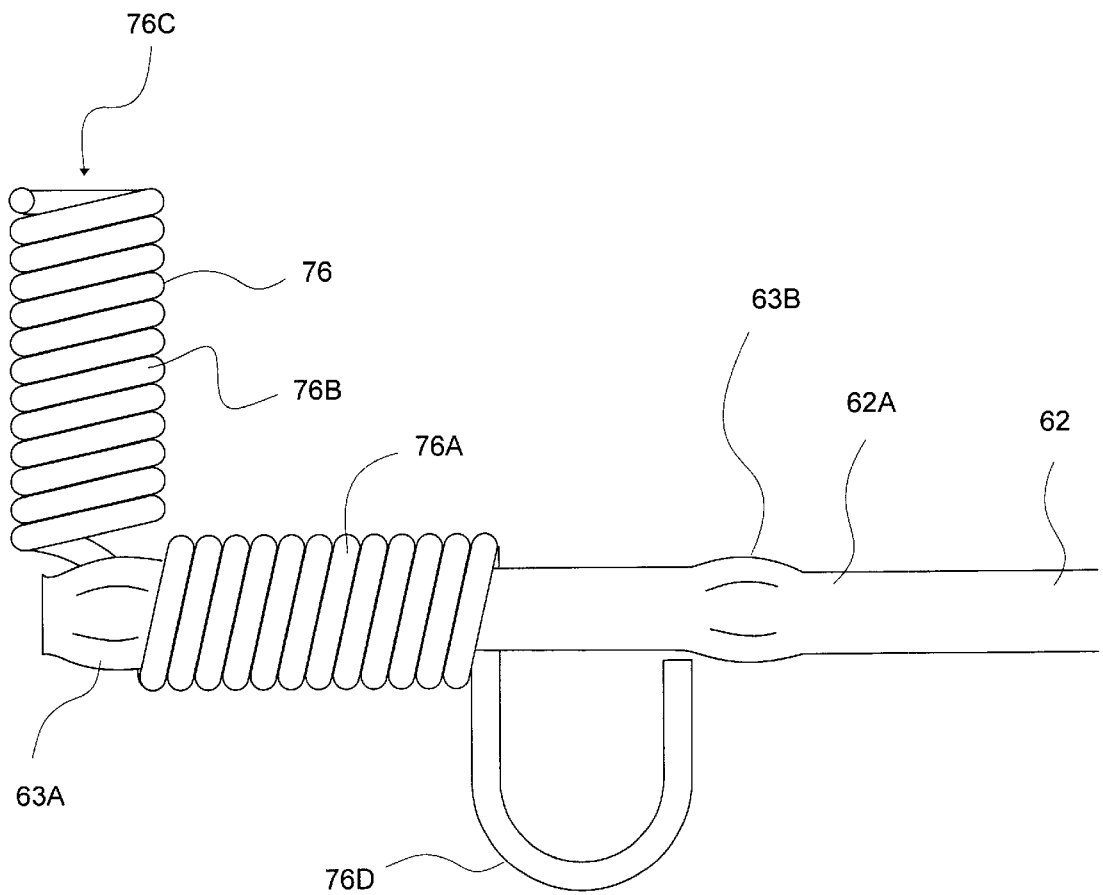
FIG. 6A is a partial side view of a first arm of a base member of an apparatus for supporting a fishing rod according to a preferred embodiment of the present invention.

Preferably, in communication with ends 62A and 62B of first arm 62 are L-shaped coils 76 and 78, respectively, wherein coil 76 preferably possesses first coil portion 76A and second coil portion 76B, wherein first coil portion 76A is preferably in contact with end 62A of first arm 62 and secured thereto via stamped regions 63A and 63B of first arm 62, as best illustrated in FIG. 6A. Second coil portion 76B is preferably in communication with first coil portion 76A and is preferably perpendicular to first arm 62, wherein second coil portion 76B preferably possesses recess 76C for the accommodation of end 46A of first leg 46 of second rod support member 40, as more fully described below. Similarly, coil 78 preferably possesses first coil portion 78A and second coil portion 78B, wherein first coil portion 78A is preferably in contact with end 62B of first arm 62 and secured thereto via stamped regions 63C and 63D of first arm 62. Second coil portion 78B is preferably in communication with first coil portion 78A and is preferably perpendicular to first arm 62, wherein second coil portion 78B preferably possesses recess 78C for the accommodation of end 28A of second leg 28 of first rod support member 20, as more fully described below. Preferably, first coil portions 76A and 78A preferably possess U-shaped extensions 76D and 78D, respectively, extending therefrom, wherein extensions 76D and 78D preferably function to stabilize base member 60 due to the inherent elevated position of first arm 62 when situated on top of second arm 64 and through loop 65 of second arm 64.

Preferably, in communication with ends 64A and 64B of second arm 64 are L-shaped coils 80 and 82, respectively, wherein coil 80 preferably possesses first coil portion 80A and second coil portion 80B, wherein first coil portion 80A is preferably in contact with end 64A of second arm 64 and secured thereto via stamped regions 66A and 66B of second arm 64. Second coil portion 80B is preferably in communication with first coil portion 80A and is preferably perpendicular to second arm 64, wherein second coil portion 80B preferably possesses recess 80C for the accommodation of end 48A of second leg 48 of second rod support member 40, as more fully described below. Similarly, coil 82 preferably possesses first coil portion 82A and second coil portion 82B, wherein first coil portion 82A is preferably in contact with end 64B of second arm 64 and secured thereto via stamped regions 66C and 66D of second arm 64. Second coil portion 82B is preferably in communication with first coil portion 82A and is preferably perpendicular to second arm 64, wherein second coil portion 82B preferably possesses recess 82C for the accommodation of end 26A of first leg 26 of first rod support member 20, as more fully described below.

As second rod support member 40 possesses a smaller height/length than first rod support member 20, the distance of separation capable between first leg 46 and second leg 48 of second rod support member 40 is accordingly also smaller than the distance of separation between first leg 26 and second leg 28 of first rod support member 20. As such, loop 65 of second arm 64 of base member 60 is preferably positioned/formed off-center on second arm 64 to accommodate for the different distances of separation of first rod support member 20 and second rod support member 40.

Figure 8:
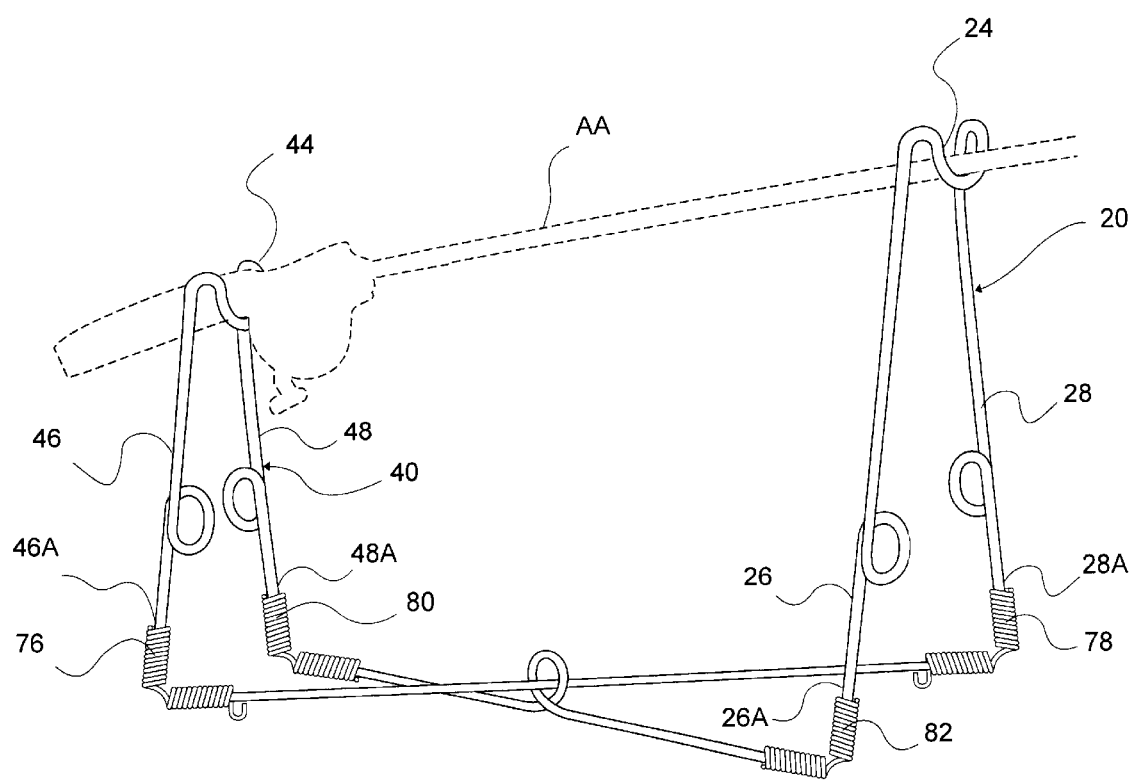
FIG. 8 is a perspective view of an apparatus for supporting a fishing rod according to a preferred embodiment of the present invention.
Figure 9:
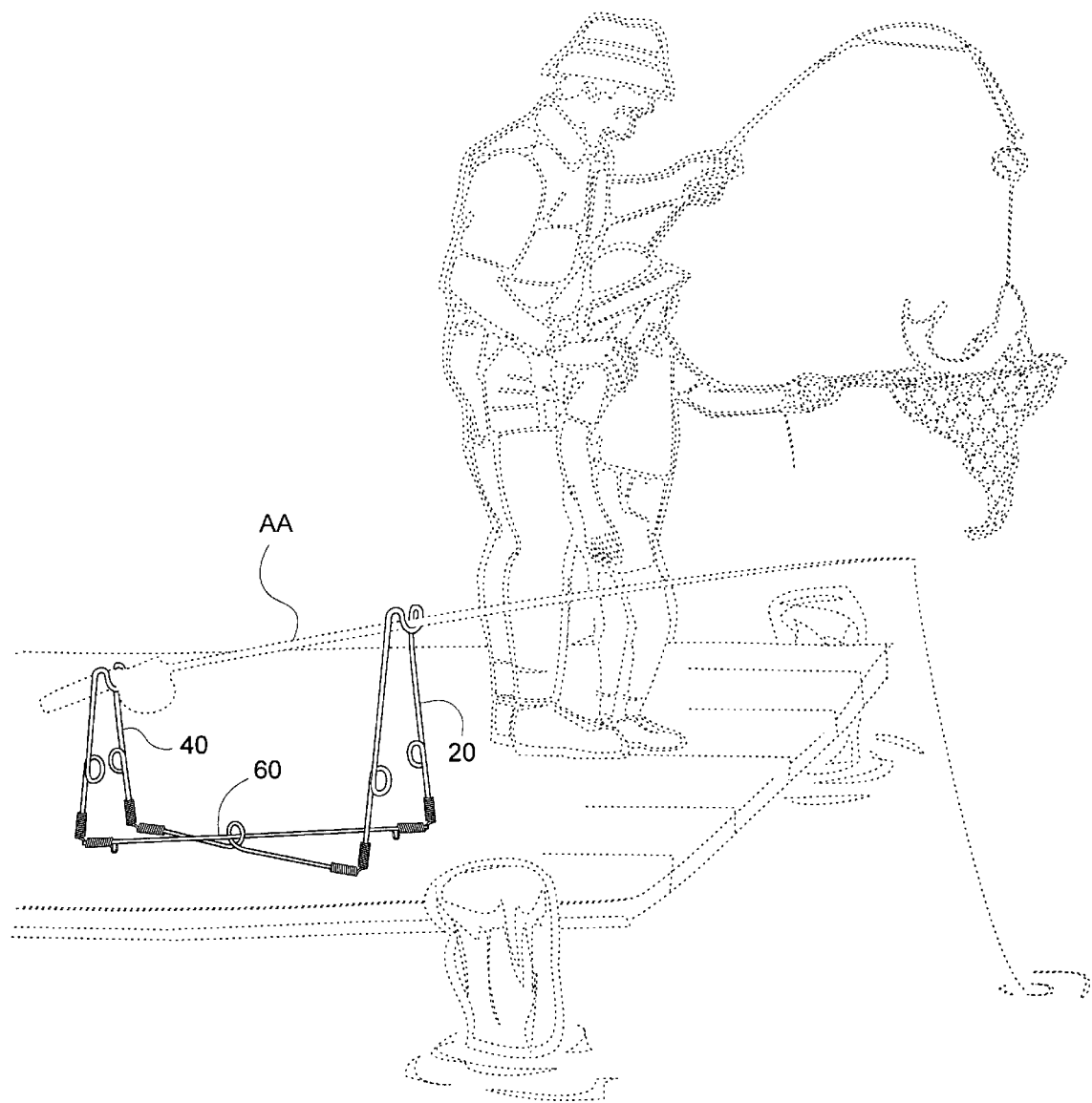
FIG. 9 is a perspective view of an apparatus for supporting a fishing rod according to a preferred embodiment of the present invention, showing the apparatus in use.

Referring now more specifically to FIGS. 7A–9, the mid-region of first arm 62 of base member 60 is preferably brought through gap 65A of loop 65 of second arm 64 of base assembly 60, wherein first arm 62 is thereafter preferably pivoted about loop 65 until further pivotal movement is prohibited therein, thus locking the mid-region of first arm 62 against loop 65. In such a configuration, second coil portions 76B, 78B, 80B and 82B of coils 76, 78, 80 and 82, respectively, are positioned substantially upward and preferably perpendicular to the ground/surface on which apparatus 10 is being deployed. Preferably, ends 26A and 28A of first leg 26 and second leg 28, respectively, of first rod support member 20 are securely received within recesses 82C and 78C, respectively, of coils 82 and 78, respectively, of base member 60, as best illustrated in FIG. 8. Similarly, ends 46A and 48A of first leg 46 and second leg 48, respectively, of second rod support member 40 are securely received within recesses 76C and 80C, respectively, of coils 76 and 80, respectively, of base member 60, as best illustrated in FIG. 8. Thereafter, a fishing rod AA is preferably positioned within cradles 24 and 44 of first rod support member 20 and second rod support member 40, respectively, to permit the proper/desired angling thereof, as best illustrated in FIGS. 8 and 9.

Figure 10:
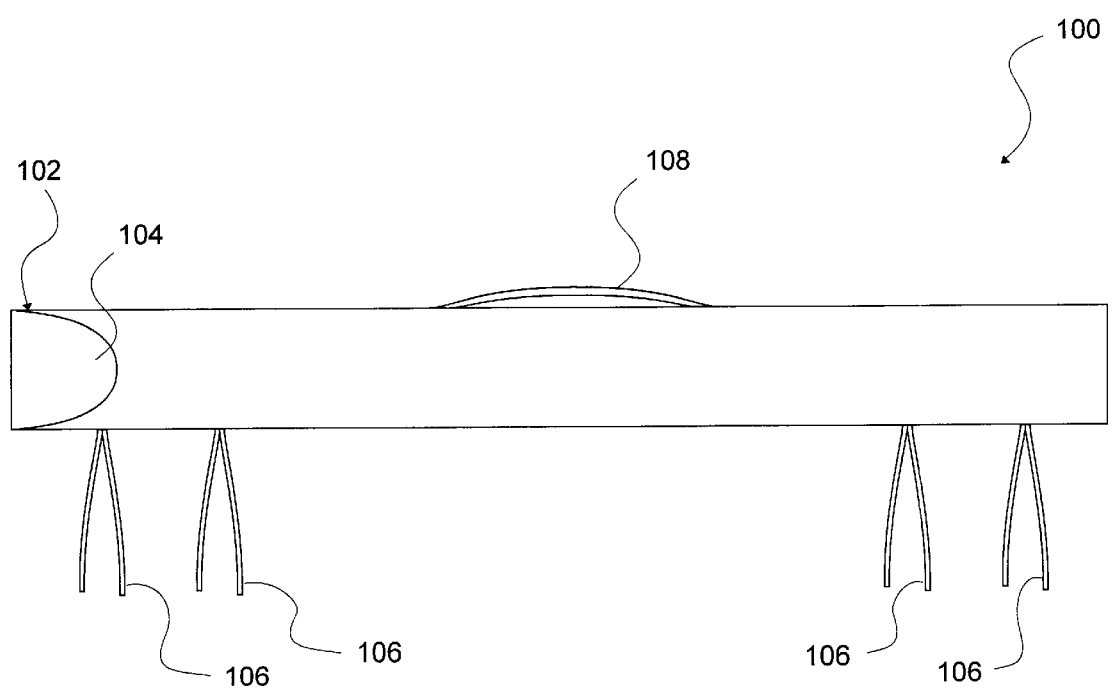
FIG. 10 is a side view of a carrying case for an apparatus for supporting a fishing rod according to a preferred embodiment of the present invention.

Referring now to FIG. 10, in a disassembled/unassembled configuration, apparatus 10 is preferably easily stored and transported within tubular-shaped carrying case 100, wherein carrying case 100 preferably possesses aperture 102 for the insertion of disassembled/unassembled apparatus 10 into case 100, and wherein a flap 102 preferably provides closure thereto. Case 100 further preferably possesses tie-strings 104 for the tied securement of fishing rods therein. Case 100 also preferably possesses handle 108 formed thereon for the convenient toting of case 100, housed apparatus 10, and fishing rods from one location to another.

It is contemplated in an alternate embodiment that first rod support member 20, second rod support member 40, base member 60, and apparatus 10 in general, can be manufactured to any size to accommodate any user.

It is contemplated in another alternate embodiment that first rod support member 20, second rod support member 40, base member 60, and apparatus 10 in general, could possess height and/or length adjustment mechanisms to adjust the overall height and/or length thereof, wherein the height and/or length adjustment mechanism could be any suitable height and/or length adjustment mechanisms known within the art, such as, for exemplary purposes only, notch-and-ball mechanisms and/or telescoping mechanisms.

It is contemplated in another alternate embodiment that first rod support member 20, second rod support member 40, base member 60, and/or apparatus 10 in general could be equipped with a mounting bracket to permit the permanent mounting thereof to any desired surface.

It is contemplated in still another alternate embodiment that base member 60 could possess any number of receiving units to accommodate a plurality of rod support members.

It is contemplated in still another alternate embodiment that apparatus 10 could be altered/modified to permit the support thereon of a plurality of fishing rods of any type, size and/or shape.

It is contemplated in yet another alternate embodiment that first rod support member 20 and second rod support member 40 could possess any number of cradles 24 and 44, respectively, for the accommodation therein of a plurality of fishing rods.

It is contemplated in yet another alternate embodiment that first rod support member 20, second rod support member 40, and base member 60 could be integrally formed together.

It is contemplated in an alternate embodiment that first rod support member 20, second rod support member 40, base member 60, and/or apparatus 10 in general could possess flotation devices to permit the utilization thereof in an aquatic environment, wherein an anchoring mechanism could be associated therewith to prevent the floating away thereof.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A fishing rod support, comprising:
   at least one first support member; and
   at least one second support member, said at least one second support member comprising a length less than said at least one first support member to enable angled positioning of the fishing rod supported on said at least one first support member and said at least one second support member;
   wherein said at least one first support member comprises at least one cradle;
   wherein said at least one first support member comprises a first leg and a second leg extending from said at least one cradle, said second leg having a length greater than said first leg, and wherein said first leg and said second leg of said at least one first support member are capable of being forcefully driven into a penetrable medium.

2. The fishing rod support of claim 1, wherein said first leg and said second leg of said at least one first support member each comprises an extension formed generally perpendicularly thereon, each said extension capable of receiving pressure to enable the forceful driving of said first leg and said second leg of said at least one first support member into a penetrable medium.

3. The fishing rod support of claim 2, wherein said extension is formed from a single rod that also is used to form said at least one first support member.

4. The fishing rod support of claim 1, further comprising at least one base, wherein said at least one first support member and said at least one second support member are receivable within said at least one base for supporting and positioning of said at least one first support member and said at least one second support member therein.

5. The fishing rod support of claim 2, wherein said at least one second support member comprises at least one cradle.

6. The fishing rod support of claim 5, wherein said at least one second support member comprises a first leg and a second leg extending from said at least one cradle, said second leg having a length greater than said first leg, and wherein said first leg and said second leg of said at least one second support are capable of being forcefully driven into a penetrable medium.

7. The fishing support rod of claim 6, wherein said first leg and said second leg of said at least one second support each comprises a loop-like extension formed generally perpendicularly thereon, each said extension capable of receiving pressure to enable the forceful driving of said first leg and said second leg of said at least one second support member into a penetrable medium.

8. The fishing rod support of claim 1, wherein said at least one cradle is an open cradle.

9. The fishing rod support of claim 8, wherein said at least one cradle is substantially U-shaped.

10. A fishing rod support, comprising:
    at least one first support member having at least one first leg in resilient communication with at least one second leg; and
    at least one first extension formed on said at least one first leg, and at least one second extension formed on said at least one second leg, wherein said at least one first extension and said at least one second extension are capable of receiving pressure to enable the forceful driving of said at least one first leg and said at least one second leg of said at least one first support member into a penetrable medium.

11. The fishing rod support of claim 10, further comprising at least one second support member having at least one first leg in resilient communication with at lest one second leg, wherein at least one first extension formed on said at least one first leg, and at least one second extension formed on said at least one second leg, are capable of receiving pressure to enable the forceful driving of said at least one first leg and said at least one second leg of said at least one second support member into a penetrable medium.

12. The fishing rod support of claim 11, wherein said at least one first support member is independent of said at least one second support member.

13. The fishing rod support of claim 12, wherein said at least one first leg of said at least one second support member is capable of being resiliently flexed away from said at least one second leg of said at least one second support member for the application of foot pressure onto said at least one first extension and said at least one second extension to forcefully drive said at least one first leg and said at least one second leg of said at least one second support member into a penetrable medium.

14. The fishing rod support of claim 12, wherein said at least one second support member comprises at least one cradle.

15. The fishing rod support of claim 12, wherein said at least one second support member comprises at least one cradle, said at least one first leg and said at least one second leg of said at least one second support member extending from said at least one cradle, and wherein said at least one first leg has a length greater than said at least one second leg.

16. The fishing rod support of claim 10, wherein said at least one first leg of said at least one first support member is capable of being resiliently flexed away from said at least one second leg of said at least one first support member for the application of foot pressure onto said at least one first extension and said at least one second extension to forcefully drive said at least one first leg and said at least one second let of said at least one first support member into a penetrable medium.

17. The fishing rod of claim 10, wherein said at least one first support member comprises at least one cradle.

18. The fishing rod support of claim 10, further comprising at least one base, wherein said at least one first support member and said at least one second support member are receivable within said at least one base for supporting and position of said at least one first support member and said at least one second support member therein.

19. The fishing rod support of claim 10, wherein said at least one first extension is a loop-like extension.

20. The fishing rod support of claim 10, wherein said at least one first extension and said at least one second extension, extend substantially inwardly toward each other.

21. The fishing rod support of claim 10, wherein the at least one first extension and said at least one first leg are formed of a single metal rod.

22. The fishing rod support of claim 10, wherein said at least one first support member comprises at least one cradle, said at least one first leg and said at least one second leg of said at least one first support member extending from said at least one cradle, and wherein said at least one first leg has a length greater than said at least one second leg.

23. A fishing rod support, comprising:
at least one first support member;
at least one second support member, said at least one second support member comprising a length less than said at least one first support member to enable angled positioning of the fishing rod supported on said at least one first support member and said at least one second support member; and
at least one base, wherein said at least one first support member and said at least one second support member are receivable within said at least one base;
wherein said at least one second support member comprises at least one cradle;
wherein said at least one second support member comprises a first leg and a second leg extending from said at least one cradle, said second leg having a length greater than said first leg, and wherein said first leg and said second leg of said at least one second support member are capable of being forcefully driven into a penetrable medium.

24. The fishing rod support of claim 23, wherein said at least one first support member comprises at least one cradle.

25. The fishing rod support of claim 23 wherein said at least one cradle of said at least one first support member comprises a first leg and a second leg extending from said at least one cradle, said second leg having a length greater than said first leg, and wherein said first leg and said second leg of said at least one first support member are capable of being forcefully driven into a penetrable medium.

26. The fishing rod support of claim 23, wherein said first leg and said second leg of said at least one first support member each comprises a loop-like extension formed generally perpendicularly thereon, said extension capable of receiving pressure to enable the forceful driving of said first leg and said second leg of said at least one first support member into a penetrable medium.

27. The fishing rod support of claim 23, wherein said at least one second support member comprises at least one cradle.

28. The fishing rod support of claim 23, wherein said first leg and said second leg of said at least one second support member each comprises a loop-like extension formed generally perpendicularly thereon, said extension capable of receiving pressure to enable the forceful driving of said first leg and said second leg of said at least one second support member into a penetrable medium.

29. A fishing rod support comprising:
at least one first support member;
at least one second support member, said at least one second support member comprising a length less than said at least one first support member to enable angled positioning of the fishing rod supported on said at least one first support member and said at least one second support member: and
at least one base, wherein said at least one first support member and said at least one second support member are receivable within said at least one base;
wherein said at least one base comprises a first arm having an uninterrupted length, and a second arm having a length interrupted by a loop formed generally above a mid-region of said second arm, said first arm capable of being received by said loop of said second arm and pivotally rotated and locked therein.

30. The fishing rod support of claim 29, wherein said at least one base further comprises coiled receiving units positioned at the ends of each of said first arm and said second arm, wherein said first leg and said second let of said at least one first support member and said first leg and said second leg of said at least one second support member are receivable within said coiled receiving units for the upright support and positioning of said at least one first support member and said at least one second support member therein.

31. The fishing rod support of claim 29, wherein said at least one first support member comprises at least one cradle.

32. The fishing rod support of claim 29, wherein said at least one first support member comprises a first leg and a second leg, each extending from said at least one cradle, said second leg having a length greater than said first leg, and wherein said first leg and said second leg of said at least one first support member are capable of being forcefully driven into a penetrable medium.

33. The fishing rod support of claim 29, wherein said first leg and said second leg of said at least one first support member each comprises a loop-like extension formed generally perpendicularly thereon, said extension capable of receiving pressure to enable the forceful driving of said first leg and said second leg of said at least one first support member into a penetrable medium.

34. The fishing rod support of claim 29, wherein said at least one second support member comprises at least one cradle.

35. A method of supporting and angling a fishing rod, comprising the steps of:
obtaining a fishing rod support, said fishing rod support comprising:
at least one first support member; and
at least one second support member, said at least one second support member comprising a length less than said at least one first support member to enable angled positioning of the fishing rod supported on said at least one first support member and said at least one second support member;
penetrably driving said at least one first support member into a permeable surface by applying foot pressure onto loop-like extensions formed generally perpendicularly on a first leg and a second leg of said at least one first support member, wherein said second leg of said at least said one first support member is greater in length than said second first leg of said at least one first support member;
positioning said at least one second support member a sufficient distance from said at least one first support member to enable proper support of the fishing rod thereon;
penetrably driving said at least one second support member into a permeable surface by applying foot pressure onto loop-like extensions formed generally perpendicularly on a first leg and a second leg of said at least one second support member, wherein said second leg of said at least one first support member is greater in length than said second leg of said at least one second support member;
placing a portion of the fishing rod onto at least one cradle of said at least one first support member; and
placing another portion of the fishing rod onto at least one cradle of said at least one second support member to achieve a desired supportive angling of the fishing rod carried therein.

36. The method of claim 35, wherein said fishing rod support further comprises at least one base, wherein said at least one first support member and said at least one second support member are receivable within said at least one base for supporting and positioning of said at least one first support member and said at least one second support member on a surface.

37. The method of claim 36, wherein said at least one base comprises a first arm having an uninterrupted length, and a second arm having a length interrupted by a loop formed above a mid-region of said second arm, said first arm capable of being received by said loop of said second arm and pivotally rotated and locked therein.

38. The method of claim 37, further comprising the steps of:
removing said at least one first support member and the at least one second support member from the permeable surface; and
placing said first leg and said second leg of said at least one first support member and said first leg and said second leg of said at least one second support member within coiled receiving units positioned at the ends of each of said first arm and said second arm of said at least one base.

39. The method of claim 35, wherein, in positioning said at least one second support member, said at least one second support member is positioned such that supportive angling of the fishing rod is enabled despite the permeable surface not being level.

40. A fishing rod support, comprising:
at least one first support member; and
at least one second support member, said at least one second support member comprising a length less than said at least one first support member to enable an angled positioning of the fishing rod supported on said at least one first support member and said at least one second support member, said at least one second support member being detached from and independently positionable with respect to said at least one first support member such that a distance between said at least one second support member and said at least one first support member is adjustable.

41. The fishing rod support of claim 40, wherein said at least one second support member comprises at least one cradle.

42. The fishing rod support of claim 40, wherein said at least one second support member comprises a first leg and a second leg extending from said at least one cradle, said second leg having a length greater than said first leg, and wherein said first leg and said second leg of said at least one second support are capable of being forcefully driven into a penetrable medium.

43. The fishing support rod of claim 40, wherein said first leg and said second leg of said at least one second support each comprises a loop-like extension formed generally perpendicularly thereon, each said extension capable of receiving pressure to enable the forceful driving of said first leg and said second leg of said at least one second support member into a penetrable medium.

44. The fishing rod support of claim 40, wherein said at least one first support member comprises at least one cradle.

45. The fishing rod support of claim 40, wherein said at least one cradle of said at least one first support member comprises a first leg and a second leg extending from said at least one cradle, said second leg having a length greater than said first leg, and wherein said first leg and said second leg of said at least one first support member are capable of being forcefully driven into a penetrable medium.

46. The fishing rod support of claim 40, wherein said first leg and said second leg of said at least one first support member each comprises an extension formed generally perpendicularly thereon, each said extension capable of receiving pressure to enable the forceful driving of said first leg and said second leg of said at least one first support member into a penetrable medium.

47. A fishing rod support, comprising:

at least one first support member;

at least one second support member, said at least one second support member comprising a length less than said at least one first support member to enable angled positioning of the fishing rod supported on said at least one first support member and said at least one second support member, said at least one second support member being detachable from and independently positionable with respect to said at least one first support member such that a distance between said at least one second support member and said at least one first support member is adjustable; and at least one base, wherein said at least one first support member and said at least one second support member are receivable within said at least one base and fixed thereto such that the distance between said at least one second support member and said at least one first support member is fixed;

wherein, when said at least one first support member and said at least one second support member are detached from said at least one base, said at least one first support member and said at least one second support member can be forcefully driven into a penetrable medium such that supportive angling of the fishing rod is enabled despite the penetrable medium not being level; and wherein, when said at least one first support member and said at least one second support member are fixed to said at least one base, supportive angling of the fishing rod is enabled on a substantially level surface.

48. The fishing rod support of claim 47, wherein said first leg and said second leg of said at least one second support member each comprises a loop-like extension formed generally perpendicularly thereon, said extension capable of receiving pressure to enable the forceful driving of said first leg and said second leg of said at least one second support member into a penetrable medium.

49. The fishing rod support of claim 47, wherein said at least one base comprises a first arm having an uninterrupted length, and a second arm having a length interrupted by a loop formed generally above a mid-region of said second arm, said first arm capable of interlocking with said second arm.

50. The fishing rod support of claim 47, wherein said at least one base further comprises receiving units positioned at the ends of each of said first arm and said second arm, wherein said first leg and said second let of said at least one first support member and said first leg and said second leg of said at least one second support member are receivable within said receiving units for the upright support and positioning of said at least one first support member and said at least one second support member therein.

51. The fishing rod support of claim 47, wherein said at least one first support member comprises at least one cradle.

52. The fishing rod support of claim 47, wherein said at least one cradle of said at least one first support member comprises a first leg and a second leg extending from said at least one cradle, said second leg having a length greater than said first leg, and wherein said first leg and said second leg of said at least one first support member are capable of being forcefully driven into a penetrable medium.

53. The fishing rod support of claim 47, wherein said first leg and said second leg of said at least one first support member each comprises a loop-like extension formed generally perpendicularly thereon, said extension capable of receiving pressure to enable the forceful driving of said first leg and said second leg of said at least one first support member into a penetrable medium.

54. The fishing rod support of claim 47, wherein said at least one second support member comprises at least one cradle.

55. The fishing rod support of claim 47, wherein said at least one second support member comprises a first leg and a second leg extending from said at least one cradle, said second leg having a length greater than said first leg, and wherein said first leg and said second leg of said at least one second support member are capable of being forcefully driven into a penetrable medium.

* * * * *